United States Patent
Wünning et al.

(10) Patent No.: US 8,313,867 B2
(45) Date of Patent: Nov. 20, 2012

(54) FUEL CELL SYSTEM

(75) Inventors: Joachim A. Wünning, Leonberg (DE);
Hans-Peter Schmid, Hohengehren (DE)

(73) Assignee: WS Reformer GmbH, Rennington (DE)

( * ) Notice: Subject to any disclaimer, the term of this patent is extended or adjusted under 35 U.S.C. 154(b) by 764 days.

(21) Appl. No.: 12/384,200

(22) Filed: Mar. 31, 2009

(65) Prior Publication Data
US 2009/0191436 A1 Jul. 30, 2009

Related U.S. Application Data

(63) Continuation-in-part of application No. PCT/EP2007/008311, filed on Sep. 25, 2007.

(30) Foreign Application Priority Data

Oct. 5, 2006 (DE) .......................... 10 2006 047 493

(51) Int. Cl.
*H01M 8/06* (2006.01)

(52) U.S. Cl. ........ 429/408; 429/410; 429/412; 429/419; 429/428; 429/433; 429/437; 429/440; 429/479; 429/535

(58) Field of Classification Search .......... 429/408, 429/410, 412, 419, 420, 428, 433–437, 440, 429/443, 479, 535
See application file for complete search history.

(56) References Cited

U.S. PATENT DOCUMENTS

| 3,745,047 | A | * | 7/1973 | Fanciullo et al. ............. 429/423 |
| 3,964,930 | A | | 6/1976 | Reiser |
| 4,554,223 | A | | 11/1985 | Yokoyama et al. |
| 7,422,810 | B2 | * | 9/2008 | Venkataraman et al. ..... 429/411 |
| 2002/0119352 | A1 | * | 8/2002 | Baldauf et al. ................... 429/13 |
| 2005/0069737 | A1 | * | 3/2005 | Nomura et al. ................. 429/20 |
| 2007/0006529 | A1 | | 1/2007 | Wunning |
| 2007/0269690 | A1 | * | 11/2007 | Doshi et al. ..................... 429/19 |
| 2007/0287047 | A1 | | 12/2007 | Kaiser et al. |

FOREIGN PATENT DOCUMENTS

EP  1 645 316 A2  4/2006
GB  2 405 028 A  2/2005

OTHER PUBLICATIONS

Official Action from the Chinese Patent Office in connection with the copending Chinese Patent Application with English translation attached dated Nov. 11, 2010.

* cited by examiner

*Primary Examiner* — Steven Loke
*Assistant Examiner* — Cuong Nguyen
(74) *Attorney, Agent, or Firm* — R. S. Lombard; K. Bach

(57) ABSTRACT

The fuel cell system in accordance with the invention is used for the generation of current and heat from liquid and gaseous fuels. Said system comprises a reformer and a fuel cell stack having an operating temperature above 120° C. and providing exhaust heat that is utilized for the generation of steam in the evaporation channels (2). The evaporation channels (2) are arranged so as to be in direct thermal contact with the stack (1) that is to be cooled. A pressure-maintaining device at the outlet of the evaporation channels (2) is disposed to adjust the pressure in said channels to a value that results in the desired stack temperature.

10 Claims, 2 Drawing Sheets

FUEL CELL SYSTEM

CROSS-REFERENCE TO RELATED APPLICATION

This is a continuation-in-part application of pending international application PCT/EP2007/008311 filed Sep. 25, 2007 and claiming the priority of German application No. 10 2006 047 493.7 filed Oct. 5, 2006.

BACKGROUND OF THE INVENTION

Fuel cell systems are used for the conversion of energy from liquid and gaseous fuels into electrical current and heat. The conversion of energy takes place quietly in the fuel cell and at an efficiency ratio of between 50% and 60% during the conversion of chemical into electrical energy, depending on the selected current density in the cell. The advantages over an engine-driven current generator are particularly effective in the kW range in the case of small outputs as are required for the net-remote power supply and for decentralized power-heat coupling. Consequently, work to develop fuel cell systems is done worldwide, however, until now without any break-through on the market.

The reasons therefor are mainly the high manufacturing costs for the complete, highly complex system. This system comprises fuel processing (using a so-called fuel processor) with a reformer and the fuel cell stack as well as with peripheral components such as heat exchangers, pumps, valves and electrical apparatus for automatic operation.

The Polymer Electrolyte Membrane (PEM) fuel cells that are equipped with polymer membranes and designed for operating temperatures up to approximately 80° C. require carbon monoxide, CO, fine-scrubbing of the reformate up into the parts per million, ppm, range and expensive water management for the humidification of the cathode air. In this case, the process water for the steam reformer may not be evaporated with the exhaust heat of the stack, because the temperature is too low for this.

Document WO 2005/084771 A2, or U.S. Patent Application Publication No.: US 2007/0006592 published Jan. 11, 2007 in the same patent publication family, describes a compact reformer with an integral evaporator. This can be used for reformation with an efficiency ratio of up to 80%. The resultant electrical efficiency ratio for the entire system is 35 to 40% if losses of 10 to 15% of the gross power generation due to auxiliary assemblies such as pumps, blowers and current transducers are taken into account.

Considering high-temperature PEM cells (publication by PEMEAS und Pat) that have recently become available and that operate at temperatures of 120 to 200° C., the CO fine-scrubbing and the water management may be omitted, thus permitting a considerable simplification of the process. In addition, the exhaust heat of the stack may be used for the evaporation of the process water.

The object of the invention is to further simplify the overall process on the basis of high-temperature cells in order to lower the manufacturing costs and to provide a safer automatic operation. In so doing, the electrical efficiency ratio of the total system should not drop below the level of 35 to 40% and, if possible, be even higher.

SUMMARY OF THE INVENTION

The fuel cell system and method in accordance with the invention is used for the generation of electrical current and heat from liquid and gaseous fuels. The system comprises a reformer and a fuel cell stack having an operating temperature at about 120° C. or above and providing exhaust heat that is utilized for the generation of steam in evaporation channels (2). The evaporation channels (2) are arranged so as to be in direct thermal contact with the stack (1) that is to be cooled. A pressure-maintaining device in fluid communication with the outlet of the evaporation channels (2) is disposed to adjust the pressure in the channels (2) to a value that results in the desired stack temperature.

The high-temperature stack and preferably also the shift stage or the shift reactor are cooled in direct contact with evaporation channels and are thermostatically controlled with the aid of the steam pressure. Thus, the exhaust heat of at least the stack and, optionally, also that of the shift reactor is utilized, thus improving the efficiency ratio.

The size and complexity of the apparatus is reduced. In addition to the stack and the reformer, essentially only an air blower, a water pump, a condenser as well as a few valves and fittings are required. A separately heated steam generator is unnecessary.

Process control and process monitoring are particularly simple. There is only one control circuit for the temperature of the reformer. As regards the mass flows of fuel, air and water, a roughly proportional control is sufficient.

The electrical efficiency ratios for the total system are higher than in prior-art systems. In combination with a steam generator, it is possible to achieve an electrical efficiency ratio greater than 40% and, with the use of an autothermic reformer, up to 35%. In both cases, the total efficiency ratio for electrical current and heat is at approximately 100%.

BRIEF DESCRIPTION OF THE DRAWINGS

The following drawing figures show exemplary embodiments of the invention, in which.

DETAILED DESCRIPTION OF THE PARTICULAR EMBODIMENTS

Figure 1:
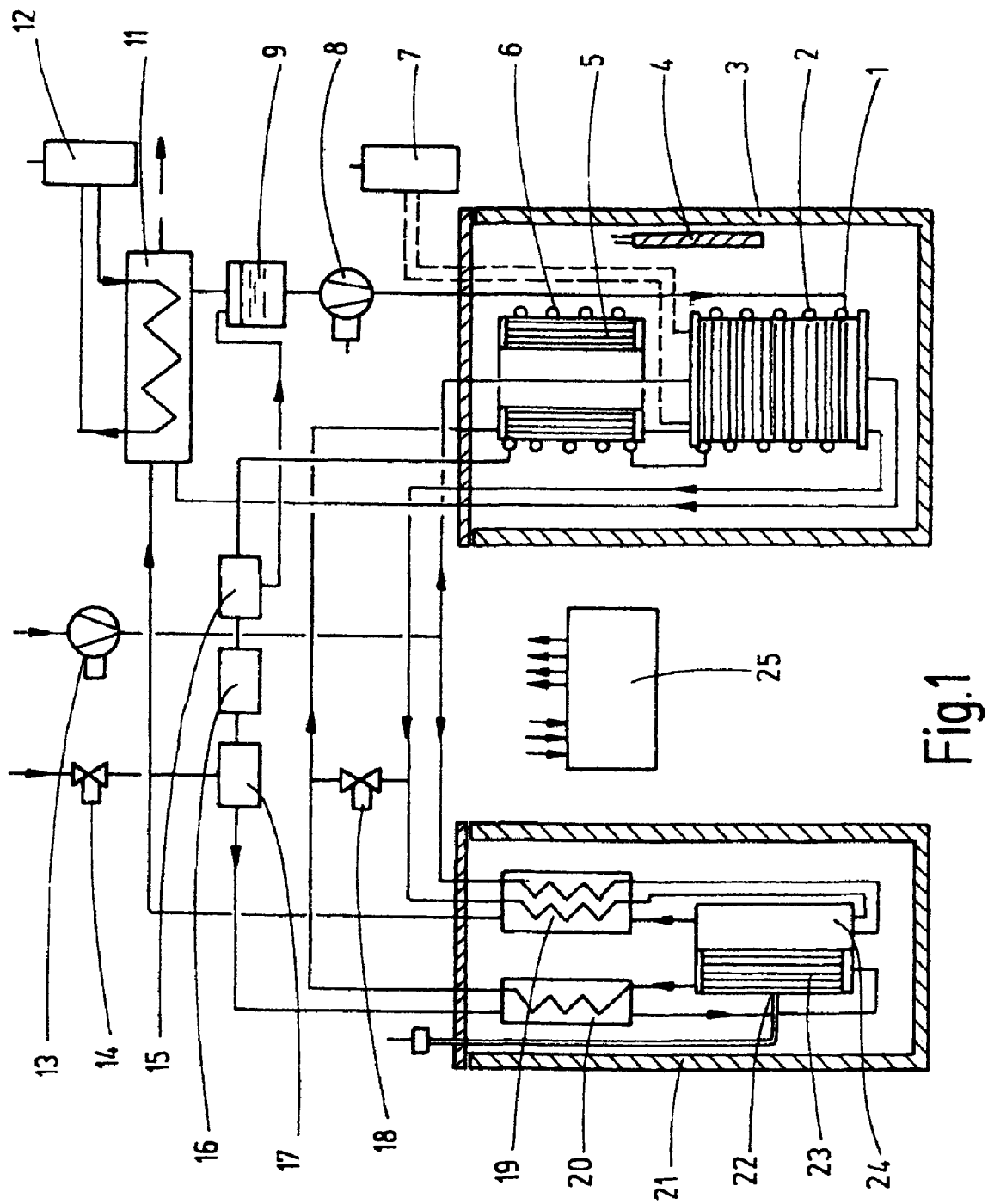
FIG. 1 is a schematic representation of an exemplary embodiment of the system in accordance with the invention; and, FIG. 2 is a modified embodiment of a system in accordance with the invention.

With reference to FIG. 1, for the generation of electrical energy, a fuel cell stack 1 is provided, said stack operating at a temperature above 100° C., preferably at about 120° C. or greater. The steam for the reformer is generated with the exhaust heat of the stack 1, said stack being thermostatically controlled with the steam pressure at the desired temperature. This is accomplished by evaporation channels 2, for example, in the form of one, or more evaporator tubes, for example, configured as tube coils, arranged directly on the stack 1, as well as by a pressure valve 16 in fluid communication with the outlet of the thusly created evaporator. In the simplest case, for example, in the case of constant output, the pressure valve is an adjustable valve. In the case of changing loads, the valve is, for example, a spring-biased pressure-maintaining valve. Alternatively, the thusly constructed pressure-maintaining device may also be represented by a controlled valve with an electronic controller.

Inasmuch as the automatic control of the stack temperature works only via the steam pressure in the wet steam region, a pump 8 provided for supplying the evaporation channel 2 feeds more water into the evaporator, i.e., into the evaporation channels 2 necessary for evaporation cooling. A water/steam mixture is formed. The excess water is separated in a separator 15 that is located downstream of the pressure-maintaining valve 16. The water separated in the separator 15 is returned to a buffer container 9.

The amount of steam generated by the stack is proportional to the power converted in the stack and, thus also proportional to the generated electrical power, and results in a steam/carbon (S/C) ratio of approximately five. The high steam excess compared with a usual ratio of 3 positively affects process safety, and does not negatively affect the efficiency ratio.

The evaporation of the water requires that the stack 1 have a minimum temperature. Therefore, the stack 1 is preferably kept at temperature in standby mode. This is accomplished by a vacuum-insulated vessel 3 in which the stack is arranged together with a heater 4.

Following the reformation, the CO content of the reformate must be lowered in high-temperature stacks from 8 to 12 vol. % to approximately 1 vol. %, which is achieved with the exothermic shift reaction on catalysts in the temperature range around 200° C. Normally, the shift reactor is an integral part of the reformer (see WO 2005/084771). The present invention departs form this principle. This temperature range overlaps with the temperature range of the stack 1. The temperature range is at 160° to 200°, for example. Therefore, it is preferred that a shift reactor 5 communicating with the evaporation channels 6 be built into the thermo container of the stack 1. In this way, it may also be ready for operation at operating temperature with the heater 4 in standby mode. In addition, the evaporator tubes 2 and 6 may be connected in series, so that water/steam may sequentially flow through them.

A steam jet pump 17 may be connected to the pressure-maintaining valve 16 in order to feed said pump. With the use of this pump and via a valve 15 connected to said pump's suction connector, fuel is taken in, thus making a fuel pump unnecessary. The steam jet pump ejects a steam/fuel mixture at its outlet. This mixture is fed to a reformer 23 via a heat exchanger 20, where it is heated further. The heat exchanger 20 is heated with the heat of the produced reformate.

Referring to the steam reformer in accordance with FIG. 1, the following components are located in a thermally insulated vessel 21:
- the reforming reactor 23 that is indirectly heated and filled with catalyst,
- the combustion chamber 24 that operates expediently in accordance with the principle of flameless oxidation (FLOX) in order to avoid thermal NOX formation,
- a heat exchanger 20, in which fuel/steam mixture ejected by the jet pump 17 is preheated, preferably counter-current to the out-flowing reformate, and
- a heat exchanger 19, which is used to preheat the combustion air conveyed by a blower 13 and the heating gas that essentially consists of residual gas of the fuel cell 1, preferably counter-current to the exhaust gas of the combustion chamber 24.

If high-efficiency counter-current apparatus are used for the heat exchangers 19 and 20, the efficiency ratio of the reformer is above 90% and is thus 10% higher than in the case of a reformer with an integrated evaporator for low-temperature stacks.

The reformate is directed into the shift reactor 5 and then into the stack 1. The residual gas exiting from the stack still contains 15 to 25% of the energy content of the reformate. This is not quite sufficient for heating the reformate, which is why the reformate can be returned to the combustion chamber 24 via the valve 18.

The exhaust gas of the combustion chamber 24 and the exhaust air of the stack 1 are cooled in a condenser 11 to the condensation temperature in order to close the water circuit. This results in a total efficiency ratio of the system for electrical current and heat of approximately 100%, with respect to the lower heating value (so-called heating value operation). Connected to the condenser 11 is a heat uncoupler that can be used for tapping the heat output, for example, in order to heat a building.

The automatic control of the total system with the controller device 25 is particularly simple. Depending on whether the system is to work with electrical current or heat as a carrier, the signal of electrical current tapping 7 or for heat uncoupling 12 is used to vary, approximately proportionally, the
- fuel supply with the valve 14,
- the air with the blower 13, and/or
- the quantity of water with the pump 8.

The exact ratio of the mass flows does not impair the safety of the process because water is conveyed in excess, and the air number, likewise, is not critical. The electrical efficiency ratio of the system is only insubstantially affected. Also, because the exhaust gases are cooled to condensation, the total efficiency ratio is very good.

The temperature control of the steam reformer comprising the temperature sensor 22 and the valve 18 represents the only required control circuit.

Figure 2:
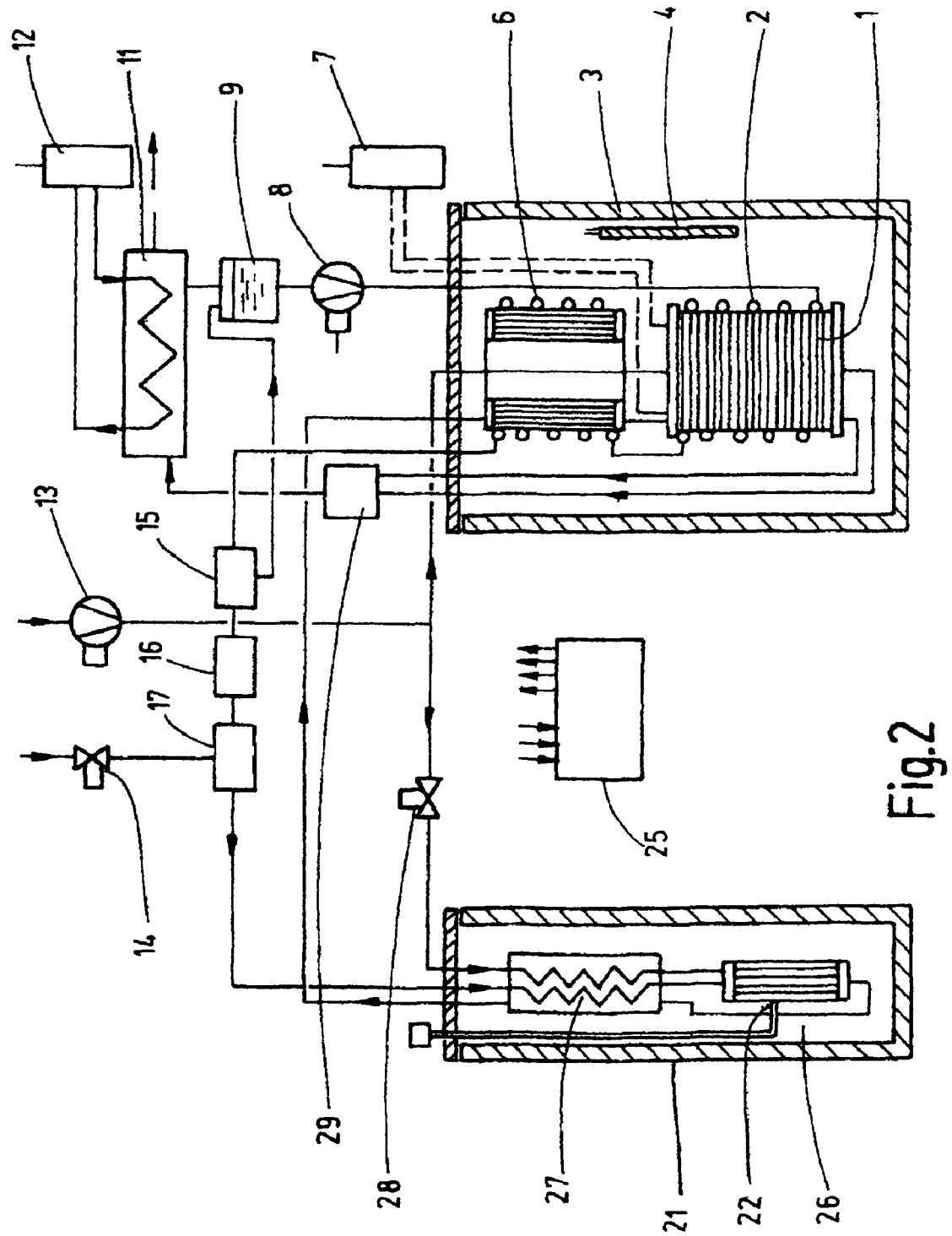

With reference to FIG. 2, it is also possible to couple the fuel cell system in accordance with the invention with an autothermic reformer. Using the same reference signs as basis, the previous description is applicable. In addition, the following is applicable. The autothermic reformation of fuels has certain advantages over steam reformation such as:
- the compact design because there is no indirect heat transfer,
- short start-up times, and
- carbonless operation, even with higher (longer chain) hydrocarbons as the fuel such as, for example, oil.

However, there is the disadvantage that the residual gas of the stack 1 having an energy content of 15 to 25% cannot be utilized for reformation. To the same extent, the electrical efficiency ratio drops. However, the total efficiency ratio remains at 100%, because operation takes place in condensation mode.

The descriptions in FIG. 2 correspond to those of FIG. 1, with the following differences:

The autothermic reformer comprises a reaction chamber 26 and a heat exchanger 27 for preheating the steam/fuel mixture and the air with the out-flowing reformate. The temperature in the reactor 26 is controlled with the sensor 22 and the air valve 28. The high steam excess that is delivered by the stack cooler contributes to process safety, in particular when difficult fuels (oil, etc.) are being used. The efficiency ratio of the reformer is above 90% when the heat exchanger 27 is a high-efficiency counter-current apparatus. The residual gas that is not reacted in the stack is combusted with air in a secondary combustion chamber 29 and then conveyed into the condenser 11.

The most important advantages are:
- The high-temperature stack, and expediently also the shift stage, are thermostatically controlled in direct contact with the evaporation channels and with the aid of steam pressure.
- The size of the apparatus is reduced. In addition to the stack and the reformer, only an air blower, a water pump, a condenser and a few valves and fittings are required.

Process control and process monitoring are particularly simple. There is only one control circuit for the temperature of the reformer. A roughly proportional control is sufficient for the mass flows of fuel, air and water.

The electrical efficiency ratios of the total system are higher than in prior-art systems. In combination with the steam reformer, an electrical efficiency ratio of over 40% can be achieved, and over 35% with an autothermic reformer. In both cases, the total efficiency ratio for current and heat is at approximately 100%.

In order to accomplish reformation, the steam/fuel ratio, the so-called steam/carbon ratio or S/C ratio, must be controlled, for example, considering steam reformation, at approximately S/C=3. Independent of output, a fuel cell delivers energy, i.e., approximately half as electrical current and half as exhaust heat. If the exhaust heat is used for steam generation, a S/C ratio of approximately 5 is the result. Indeed, this is more than is required, however, there is no need for measuring and controlling the mass flows.

Consequently, for example, the stack temperature is thermostatically controlled with a steam pressure of 10 bar and at a temperature of approximately 160° C. to 180° C., i.e., independent of output. This can be achieved with a simple pressure-maintaining valve.

What is claimed is:

1. A fuel cell system for the generation of electrical current and heat from liquid and gaseous fuels, said system comprising:
    a steam or autothermic reformer housed in a thermally insulated vessel, a fuel cell stack positioned externally of the thermally insulated vessel and operatively coupled to the steam or autothermic reformer for receiving hydrogen gas therefrom and for the generation of steam and electricity, first evaporation channels and second evaporation channels connected in fluid communication, the fuel cell stack having an operating temperature of about 120° C. or greater and adapted to provide exhaust heat that is utilized for supplying steam to the steam or autothermic reformer via the first evaporation channels and the second evaporation channels,
    the first evaporation channels in operative arrangement in direct thermal contact with the fuel cell stack for cooling the fuel cell stack to a desired temperature,
    a pressure-maintaining device in fluid communication with the outlet of the first evaporation channels and adapted to adjust the pressure in said first evaporation channels to a value that results in the desired stack temperature, and
    the steam or autothermic reformer connected in fluid communication with the pressure-maintaining device for receiving the generated steam from the fuel cell stack.

2. The fuel cell system in accordance with claim 1, wherein the pressure-maintaining device further comprises a pressure-maintaining valve, a water separator in operative arrangement with and upstream of said pressure-maintaining valve.

3. The fuel cell system in accordance with claim 1, further comprising a vacuum insulated vessel and a standby heater, the fuel cell stack and standby heater are jacketed within the vacuum insulated vessel.

4. The fuel cell system in accordance with claim 3, further comprising a shift reactor housed within the vacuum insulated vessel in heat-transferring communication with the second evaporation channels, whereby the shift reactor is cooled or heated with the generated steam.

5. The fuel cell system in accordance with claim 4, wherein the pressure-maintaining device is in fluid communication with the second evaporation channels, and the pressure-maintaining device is adapted to control the temperature of the second evaporation channels in a thermostatically controlled manner.

6. The fuel cell system in accordance with claim 2, further comprising a jet pump in operative arrangement with and downstream of the pressure-maintaining valve, the jet pump is arranged for the intake of the fluid for the reformer.

7. The fuel cell system in accordance with claim 6, further comprising a control device, a fuel valve, an air blower and a water pump, the control device in operative connection with the fuel valve, the air blower and the water pump the control device adapted to change the mass flows for fuel with the fuel valve, for air with the air blower and for water with the water pump, approximated as needed in a proportional manner.

8. The fuel cell system in accordance with claim 7, wherein the steam or autothermic reformer further includes a combustion chamber, a first counter-current heat exchanger housed in the thermally insulated vessel and connected in fluid communication with the jet pump for preheating the fuel/steam mixture ejected by the jet pump with out-flowing reformate from the steam reformer.

9. The fuel cell system in accordance with claim 7, wherein the steam or auothermic reformer comprises a reaction chamber and a heat exchanger in fluid communication with the jet pump and air blower for preheating the steam/fuel mixture from the jet pump and air from the air blower with out-flowing reformate from the reaction chamber.

10. The fuel cell system in accordance with claim 8, further comprising a second counter-current heat exchanger housed in the thermally insulated vessel and connected in fluid communication with the steam or autothermic reformer, the second counter-current heat exchanger also in fluid communication with the with the air pump and the fuel cell stack the second counter-current heat exchanger for preheating with the exhaust gas from the steam or autothermic reformer and the combustion air conveyed by the air blower and the residual gas of the fuel cell stack.

* * * * *